(12) United States Patent
Zhao (10) Patent No.: US 11,435,515 B2
(45) Date of Patent: Sep. 6, 2022

(54) BACKLIGHT MODULE AND DISPLAY DEVICE

(71) Applicant: TCL China Star Optoelectronics Technology Co., Ltd., Shenzhen (CN)

(72) Inventor: Jinyang Zhao, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 333 days.

(21) Appl. No.: 16/627,346

(22) PCT Filed: Dec. 17, 2019

(86) PCT No.: PCT/CN2019/125845
§ 371 (c)(1),
(2) Date: Dec. 30, 2019

(87) PCT Pub. No.: WO2021/109233
PCT Pub. Date: Jun. 10, 2021

(65) Prior Publication Data
US 2021/0356816 A1 Nov. 18, 2021

(30) Foreign Application Priority Data

Dec. 6, 2019 (CN) .......................... 201911241882.X (51) Int. Cl.
*G02F 1/1335* (2006.01)
*F21V 8/00* (2006.01)
*G02F 1/13357* (2006.01)

(52) U.S. Cl.
CPC ......... *G02B 6/0031* (2013.01); *G02B 6/0068* (2013.01); *G02B 6/0091* (2013.01); *G02F 1/133606* (2013.01); *G02F 1/133609* (2013.01); *G02F 1/133614* (2021.01)

(58) Field of Classification Search
CPC ......... G02F 1/133609; G02F 1/133614; G02B 6/0068
See application file for complete search history.

(56) References Cited

U.S. PATENT DOCUMENTS

| 8,207,663 | B2* | 6/2012 | Sambandan | ........ C04B 35/6268 |
| | | | | 313/503 |
| 9,455,380 | B2* | 9/2016 | Moon | ................. C09K 11/7774 |
| 2003/0127660 | A1* | 7/2003 | Bawendi | ................. H01L 33/06 |
| | | | | 257/14 |
| 2005/0249257 | A1 | 11/2005 | Leyrer et al. | |
| 2006/0066210 | A1* | 3/2006 | Ng | ........................ H01L 33/504 |
| | | | | 313/486 |

(Continued)

FOREIGN PATENT DOCUMENTS

| CN | 1669191 | 9/2005 |
| CN | 102478187 | 5/2012 |

(Continued)

*Primary Examiner* — Julie A Bannan (57) ABSTRACT

The present invention provides a backlight module and a display device. The backlight module includes a blue laser diode and a laser radiation film. A light emitting surface of the blue laser diode is disposed close to the laser radiation film. A blue laser emitted by the blue laser diode excites the laser radiation film to emit a red laser and a green laser, and the blue laser, the red laser, and the green laser are mixed to form white light.

16 Claims, 4 Drawing Sheets

(56) References Cited

U.S. PATENT DOCUMENTS

| | | | | |
|---|---|---|---|---|
| 2008/0013338 A1* | 1/2008 | Huang | ............... | G02B 6/0043 |
| | | | | 362/606 |
| 2008/0128735 A1* | 6/2008 | Yoo | ............... | H01L 33/504 |
| | | | | 257/E33.061 |
| 2014/0022779 A1* | 1/2014 | Su | ............... | F21V 9/38 |
| | | | | 362/231 |
| 2015/0369989 A1* | 12/2015 | Hsu | ............... | G02B 6/005 |
| | | | | 349/65 |
| 2016/0054486 A1* | 2/2016 | Isojima | ............... | G02B 5/0226 |
| | | | | 362/330 |
| 2017/0328539 A1* | 11/2017 | Huang | ............... | F21V 9/30 |
| 2020/0127174 A1* | 4/2020 | Zhong | ............... | H01L 33/504 |

FOREIGN PATENT DOCUMENTS

| | | |
|---|---|---|
| CN | 103278961 | 9/2013 |
| CN | 205910485 | 1/2017 |
| CN | 107688270 | 2/2018 |
| CN | 207440478 | 6/2018 |

\* cited by examiner

BACKLIGHT MODULE AND DISPLAY DEVICE

This application is a National Phase of PCT Patent Application No. PCT/CN2019/125845 having International filing date of Dec. 17, 2019, which claims the benefit of priority of Chinese Patent Application No. 201911241882.X filed on Dec. 6, 2019. The contents of the above applications are all incorporated by reference as if fully set forth herein in their entirety.

FIELD AND BACKGROUND OF THE INVENTION

The present invention relates to the field of display devices, and in particular, to a backlight module and a display device.

Laser displays are technologies that use lasers as light sources to implement information display functions. Due to characteristics of narrow spectral line width, pure spectrum, and high brightness, laser display technologies have advantages of wide color gamut range, high saturation, and large number of colors. The lasers have very high electro-optical conversion efficiencies. As display light sources, they have very high spectral efficiencies and no stray light, so they have low power consumptions and are more energy-efficient and environmentally friendly.

At present, the laser displays are mainly used in the field of laser projections. Laser projection display technologies are mainly used in large-screen display devices such as public information large screens, laser TVs, and digital cinemas. For portable miniaturized devices such as mobile phones, laptops, and tablets, the laser projection devices are large in sizes and unsuitable in structures. Therefore, developments of full-color laser panels are very important for flat display devices such as mobile phones and computers. However, display light sources consisting of red, green, and blue lasers emitted by red laser diodes, green laser diodes, and blue laser diodes, respectively, have high costs and complicated preparation processes.

SUMMARY OF THE INVENTION

The present invention provides a backlight module and a display device. A blue laser emitted by a blue laser diode excites a laser radiation film to radiate a red laser and a green laser with a narrower half-value width, so that the blue laser, the red laser, and green laser are mixed to form white light for a display light source, which can solve technical problems of high costs and complicated preparation processes of the display light source composed of laser lights.

An embodiment of the present invention provides a backlight module comprising a blue laser diode and a laser radiation film, wherein a light emitting surface of the blue laser diode is disposed close to the laser radiation film; and wherein a blue laser emitted by the blue laser diode excites the laser radiation film to emit a red laser and a green laser, and the blue laser, the red laser, and the green laser are mixed to form white light.

In the backlight module provided in the embodiment of the present invention, a material of the laser radiation film comprises at least one of a laser dye, an inorganic group III or group V semiconductor material, a laser crystal, and a laser material; and wherein, the laser dye comprises at least one of coumarins, rhodamines, cyanines, and azines, the laser crystal comprises at least one of Nd:YAG crystal, Nd:YLF crystal, Nd:YV04 crystal, Yb:YAG crystal, and Nd:YAG polycrystalline ceramic, and the laser material comprises at least one of quantum dots, all-inorganic perovskites, and organic-inorganic hybrid perovskites.

In the backlight module provided in the embodiment of the present invention, the laser radiation film comprises laser radiation film units disposed in multiple layers, materials of the multilayer laser radiation film units are different from each other, and each layer of the laser radiation film units emits the red laser and the green laser after being excited by the blue laser.

In the backlight module provided in the embodiment of the present invention, the backlight module is a side-type backlight structure, and the backlight module further comprises a light guide plate and a reflective layer;

wherein an included angle between the light emitting surface of the blue laser diode and a reflective surface of the reflective layer is an acute angle, so that an emitted light is reflected through the reflective surface; and wherein an included angle between the reflection surface of the reflection layer and the light guide plate is an acute angle, so that light reflected by the reflection surface enters the light guide plate.

In the backlight module provided in the embodiment of the present invention, the laser radiation film is disposed on a side of the light guide plate close to the reflective layer;

wherein the blue laser emitted by the blue laser diode is reflected to the laser radiation film through the reflective surface of the reflection layer, and excites the laser radiation film to emit the red laser and the green laser; and wherein the white light formed by mixing the blue laser, the red laser, and the green laser is uniformly emitted through the light guide plate.

In the backlight module provided in the embodiment of the present invention, the laser radiation film covers the light emitting surface of the blue laser diode;

wherein the blue laser emitted by the blue laser diode excites the laser radiation film to emit the red laser and the green laser; and wherein the white light formed by mixing the blue laser, the red laser, and the green laser is reflected to the light guide plate through the reflection surface of the reflection layer, and is uniformly emitted through the light guide plate.

In the backlight module provided in the embodiment of the present invention, the backlight module is a direct-type backlight structure, and the backlight module further comprises an optical film group and a reflective layer that are disposed opposite with each other; and wherein the blue laser diode is disposed on the reflective layer, both the light emitting surface of the blue laser diode and a reflective surface of the reflective layer are disposed toward the optical film group, and the blue laser diode emits the blue laser in a direction of the optical film group.

In the backlight module provided in the embodiment of the present invention, the laser radiation film is disposed on a side of the optical film group close to the reflective layer;

wherein the blue laser diode emits the blue laser in a direction of the laser radiation film, and the blue laser excites the laser radiation film to emit the red laser and the green laser; and wherein the white light formed by mixing the blue laser, the red laser, and the green laser is uniformly emitted through the optical film group.

In the backlight module provided in the embodiment of the present invention, the laser radiation film covers the light emitting surface of the blue laser diode;

wherein the blue laser diode emits the blue laser in the direction of the optical film group, and the blue laser excites the laser radiation film to emit the red laser and the green laser; and wherein the white light formed by mixing the blue laser, the red laser, and the green laser is emitted toward the optical film group, and is uniformly emitted through the optical film group.

In the backlight module provided in the embodiment of the present invention, the optical film group comprises a diffusion sheet disposed close to the reflective layer, and a prism sheet disposed on a side of the diffusion sheet away from the reflective layer.

In the backlight module provided in the embodiment of the present invention, the blue laser emitted by the blue laser diode has a wavelength range of 400 nm to 450 nm.

The embodiment of the present invention further provides a display device comprising the above-mentioned backlight module and display panel disposed corresponding to the backlight module.

In the display device provided in the embodiment of the present invention, the laser radiation film comprises laser radiation film units disposed in multiple layers, materials of the multilayer laser radiation film units are different from each other, and each layer of the laser radiation film units emits the red laser and the green laser after being excited by the blue laser.

In the display device provided in the embodiment of the present invention, the backlight module is a side-type backlight structure, and the backlight module further comprises a light guide plate and a reflective layer;

wherein an included angle between the light emitting surface of the blue laser diode and a reflective surface of the reflective layer is an acute angle, so that an emitted light is reflected through the reflective surface; and wherein an included angle between the reflection surface of the reflection layer and the light guide plate is an acute angle, so that light reflected by the reflection surface enters the light guide plate.

In the display device provided in the embodiment of the present invention, the laser radiation film is disposed on a side of the light guide plate close to the reflective layer;

wherein the blue laser emitted by the blue laser diode is reflected to the laser radiation film through the reflective surface of the reflection layer, and excites the laser radiation film to emit the red laser and the green laser; and wherein the white light formed by mixing the blue laser, the red laser, and the green laser is uniformly emitted through the light guide plate.

In the display device provided in the embodiment of the present invention, the laser radiation film covers the light emitting surface of the blue laser diode;

wherein the blue laser emitted by the blue laser diode excites the laser radiation film to emit the red laser and the green laser; and wherein the white light formed by mixing the blue laser, the red laser, and the green laser is reflected to the light guide plate through the reflection surface of the reflection layer, and is uniformly emitted through the light guide plate.

In the display device provided in the embodiment of the present invention, the backlight module is a direct-type backlight structure, and the backlight module further comprises an optical film group and a reflective layer that are disposed opposite with each other; and wherein the blue laser diode is disposed on the reflective layer, both the light emitting surface of the blue laser diode and a reflective surface of the reflective layer are disposed toward the optical film group, and the blue laser diode emits the blue laser in a direction of the optical film group In the display device provided in the embodiment of the present invention, the laser radiation film is disposed on a side of the optical film group close to the reflective layer;

wherein the blue laser diode emits the blue laser in a direction of the laser radiation film, and the blue laser excites the laser radiation film to emit the red laser and the green laser; and wherein the white light formed by mixing the blue laser, the red laser, and the green laser is uniformly emitted through the optical film group.

In the display device provided in the embodiment of the present invention, the laser radiation film covers the light emitting surface of the blue laser diode;

wherein the blue laser diode emits the blue laser in the direction of the optical film group, and the blue laser excites the laser radiation film to emit the red laser and the green laser; and wherein the white light formed by mixing the blue laser, the red laser, and the green laser is emitted toward the optical film group, and is uniformly emitted through the optical film group.

In the display device provided in the embodiment of the present invention, the display panel comprises a liquid crystal display panel.

A backlight module provided in an embodiment of the present invention uses a blue laser emitted from a blue laser diode to excite a laser radiation film to radiate a red laser and a green laser with a narrower half-value width, so that the blue laser is mixed with the red laser and the green laser to form white light for a display light source, the obtained white light has better spectral purity and larger color gamut range, which is conducive to high color gamut display. Compared with an exemplary use of a red laser diode, a green laser diode, and a blue laser diode to respectively emit red, green, and blue three-color lasers to form a white light source, the backlight module of the present invention has a simple preparation process, can be well combined with current process, and can effectively reduce production costs.

BRIEF DESCRIPTION OF THE SEVERAL VIEWS OF THE DRAWINGS

The following detailed description of specific embodiments of the present invention will make the technical solution and other beneficial effects of the present invention obvious in conjunction with the accompanying drawings.

DESCRIPTION OF SPECIFIC EMBODIMENTS OF THE INVENTION

The technical solution in the embodiments of the present invention will be clearly and completely described below with reference to the accompanying drawings in the embodiments of the present invention. It is to be understood that the described embodiments are merely exemplary of the invention, and not restrictive of the full scope of the invention. All other embodiments, which can be obtained by a person skilled in the art without inventive step based on the embodiments of the present invention, are within the scope of the present invention.

In the description of the present invention, it is to be understood that the terms "center," "longitudinal," "lateral," "length," "width," "thickness," "upper," "lower," "front," "rear," "left," "right," "vertical," "horizontal," "top," "bottom," "inner," "outer," "clockwise," "counterclockwise," and the like are used in the orientations and positional relationships indicated in the drawings for convenience in describing the present invention and for simplicity in description, and are not intended to indicate or imply that the referenced devices or elements must have a particular orientation, be constructed in a particular orientation, and be operated in a particular manner, and are not to be construed as limiting the present invention. Furthermore, the terms "first" and "second" are used for descriptive purposes only and are not to be construed as indicating or implying relative importance or implicitly indicating the number of technical features indicated. Thus, features defined as "first", "second", may explicitly or implicitly include one or more of the described features. In the description of the present application, "plurality" means two or more unless specifically limited otherwise.

In the description of the present invention, it is to be noted that, unless otherwise explicitly specified or limited, the terms "mounted," "connected," and "linked" are to be construed broadly, e.g., as meaning either a fixed connection, a removable connection, or an integral connection; may be mechanically connected, may be electrically connected or may be in communication with each other; either directly or indirectly through intervening media, either internally or in any other relationship. The specific meaning of the above terms in the present invention can be understood by those of ordinary skill in the art as appropriate.

In the present invention, unless otherwise specifically defined and defined, the first feature is "on" or "under" the second feature may include that the first feature is in direct contact to the second feature, and may also include that the first feature and the second feature are not in direct contact but through additional features between them. Moreover, the first feature is "on," "above," and "under" the second feature includes the first feature is directly above and obliquely above the second feature, or merely indicating that the high of the first feature is higher than the second feature. The first feature is "below," "under," and "lower" the second feature includes the first feature is directly below and obliquely below the second feature, or merely indicating that the high of the first feature is less than the second feature.

The following disclosure provides many different embodiments or examples for implementing different features of the invention. In order to simplify the disclosure of the present invention, specific example components and arrangements are described below. Of course, they are merely examples and are not intended to limit the present invention. Moreover, the present invention may repeat reference numerals and/or letters in the various examples, such repetition is for the purpose of simplicity and clarity and does not in itself dictate a relationship between the various embodiments and/or configurations discussed. In addition, examples of various specific processes and materials are provided herein, but one of ordinary skill in the art may recognize applications of other processes and/or uses of other materials.

Based on stimulated radiation characteristics of laser materials, the laser materials emit light spontaneously at low excitation power, so their half-peak widths are broad. When a laser power increases beyond a threshold of the material, a light emission process is stimulated radiation, so its spectrum will narrow. Based on the spectral narrowing characteristics of the laser material above the threshold, the present invention uses a blue laser to excite a red/green light emitting laser material to obtain a red/green light source with a very narrow half-peak width. The red, green, and blue colors are thus mixed to form white light, which is used as a backlight of the display panel. The backlight has better spectral purity, a larger color gamut range, is very suitable for high color gamut display, and has a simple process, which can be well combined with a current backlight process and display panel process.

Figure 1:
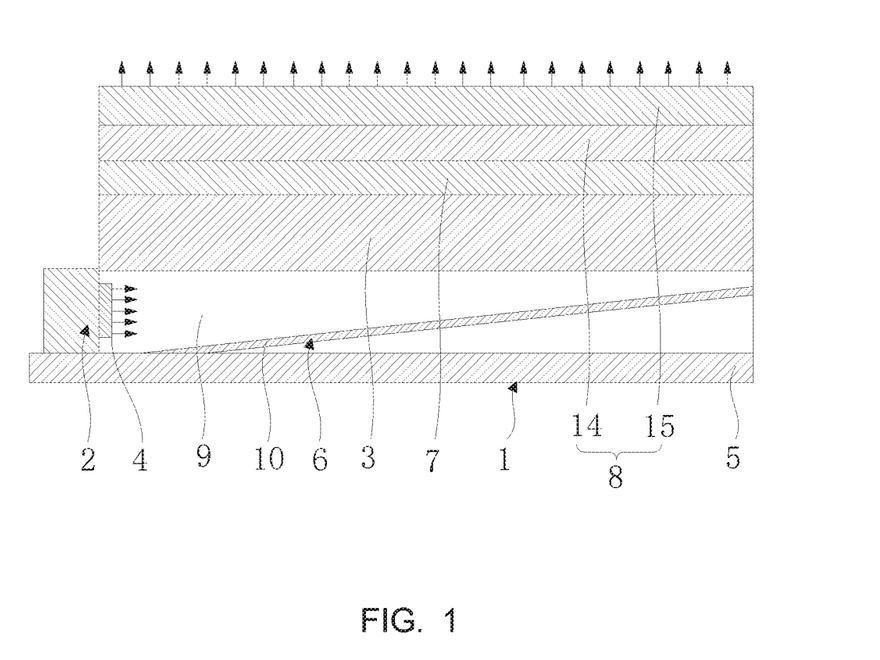
FIG. 1 is a partial structural schematic view of a side-type backlight module provided by an embodiment of the present invention.

Specifically, as shown in FIG. 1, an embodiment of the present invention provides a side-type backlight module 1. The backlight module 1 comprises a blue laser diode 2 and a laser radiation film 3, wherein a light emitting surface 4 of the blue laser diode 2 is disposed close to the laser radiation film 3. A blue laser emitted by the blue laser diode 2 excites the laser radiation film 3 to emit a red laser and a green laser, and the blue laser, the red laser, and the green laser are mixed to form white light.

Specifically, the backlight module 1 further comprises a back plate 5, a reflective layer 6 disposed on the back plate 5, a light guide plate 7 disposed on the reflective layer 6, and an optical film group 8 disposed on a side of the light guide plate 7 away from the reflective layer 6. The laser radiation film 3 is disposed on the side of the light guide plate 7 close to the reflective layer 6. A light source cavity 9 is formed between the laser radiation film 3 and the reflective layer 6, and the blue laser diode 2 is disposed on a side of the light source cavity 9. An included angle between the light emitting surface 4 of the blue laser diode 2 and a reflective surface 10 of the reflective layer 6 is an acute angle, so that an emitted light is reflected through the reflective surface 10, and an included angle between the reflection surface 10 of the reflection layer 6 and the light guide plate 7 is an acute angle, so that light reflected by the reflection surface 10 enters the light guide plate.

Figure 2:
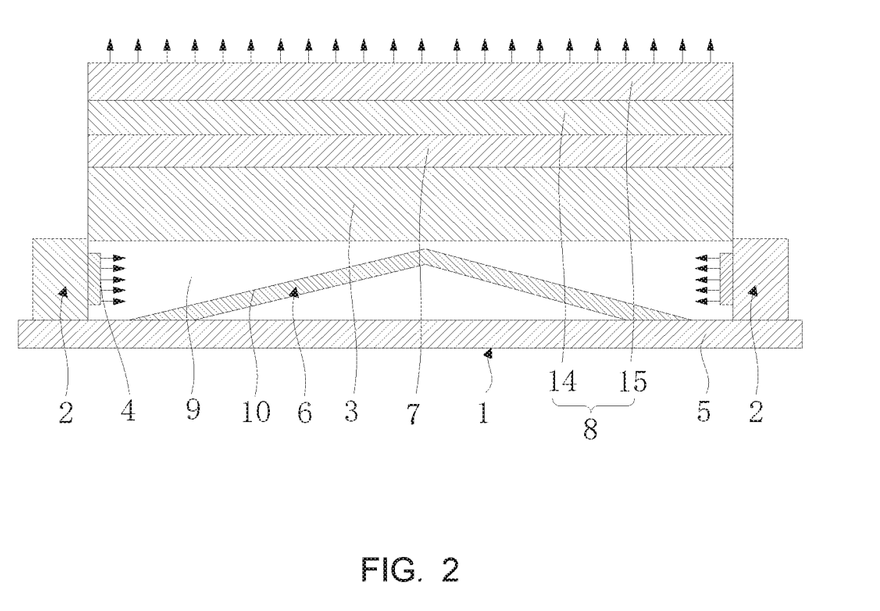
FIG. 2 is a partial structural schematic view of another side-type backlight module provided by the embodiment of the present invention.

It should be noted that a plurality of blue laser diodes 2 are arranged in an array on the side of the light source cavity 9. The plurality of blue laser diodes 2 may be disposed on only one side of the light source cavity 9, or may be disposed on multiple sides of the light source cavity 9, which is not limited herein. A shape of the reflective layer 6 is determined by a number of side surfaces on which the blue laser diode 2 is disposed. When the number of the side surfaces disposed on the blue laser diode 2 is greater than 1, the reflection surface 10 of the reflection layer 6 is a multi-stage folded surface or a non-smooth hypersurface. As shown in FIG. 2, the blue laser diode 2 is disposed on both sides of the light source cavity 9. Correspondingly, the reflective surface 10 of the reflective layer 6 is a two-stage folded surface. The included angle between each folded surface and the light emitting surface 4 of the corresponding blue laser diode 2 is an acute angle, and the included angle between the folded surface and the light guide plate 7 is an acute angle.

Specifically, the blue laser emitted by the blue laser diode 2 is reflected to the laser radiation film 3 through the reflection surface 10 of the reflection layer 6 and excites the laser radiation film 3 to emit the red laser and the green laser.

The white light formed by mixing the blue laser, the red laser, and the green laser is uniformly emitted through the light guide plate 7.

Specifically, the light guide plate 7 comprises a light entrance surface and a light exit surface 4, wherein the light entrance surface is disposed close to the reflective layer 6, and the light exit surface 4 is disposed away from the reflective layer 6.

Specifically, the optical film group 8 comprises a diffusion sheet 14 and a prism sheet 15 disposed on the light guide plate 7 in order. Of course, the optical film group 8 may also be a combined structure between a plurality of diffusion sheets and a plurality of prism sheets, which is not limited here. The reflective layer 6 comprises a reflective film or a reflective smear.

Specifically, a wavelength range of the blue laser emitted by the blue laser diode 2 is 400 nm to 450 nm. In an embodiment, the wavelength of the blue laser emitted by the blue laser diode 2 is 430 nm.

Specifically, a material of the laser radiation film comprises at least one of a laser dye, an inorganic group III or group V semiconductor material, a laser crystal, and a laser material. The laser dye comprises at least one of coumarins, rhodamines, cyanines, and azines. The laser crystal comprises at least one of Nd:YAG crystal, Nd:YLF crystal, Nd:YV04 crystal, Yb:YAG crystal, and Nd:YAG polycrystalline ceramic. The laser material comprises at least one of quantum dots, all-inorganic perovskites, and organic-inorganic hybrid perovskites.

In the embodiment, the blue laser emitted by the blue laser diode 2 excites the laser radiation film 3 to radiate the red laser and the green laser with narrower half-value widths, so that the blue laser is mixed with the red laser and the green laser to form the white light for a display light source. On one hand, the obtained white light has better spectral purity and a larger color gamut range, which is conducive to high color gamut display. On the other hand, the laser radiation film 3 can obtain a uniform surface light source, and the light guide plate 7 and the optical film group 8 can further improve a uniformity of the backlight. In addition, compared with an exemplary use of a red laser diode, a green laser diode, and a blue laser diode to respectively emit red, green, and blue three-color lasers to form a white light source, the backlight module of the present invention has a simple preparation process, can be well combined with current process, and can effectively reduce production costs.

Figure 3:
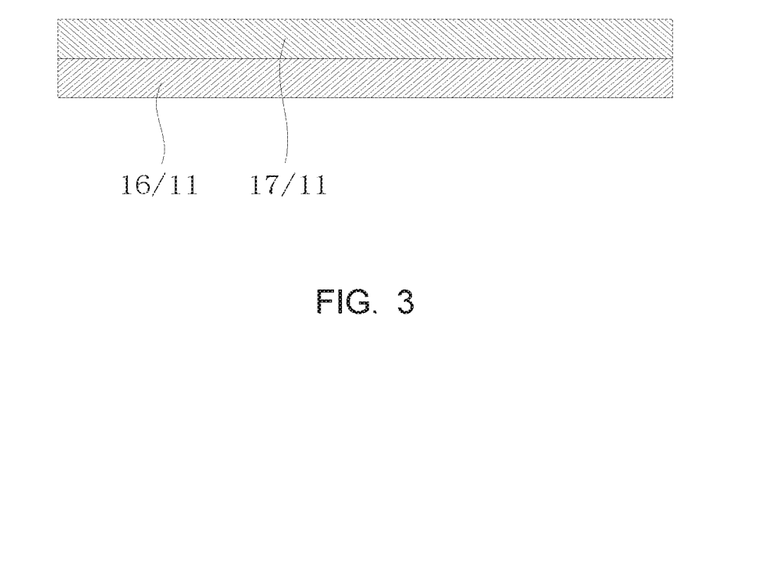
FIG. 3 is a schematic structural view of a laser radiation film provided by the embodiment of the present invention.

In an embodiment, as shown in FIG. 3, the laser radiation film 3 comprises laser radiation film units 11 disposed in multiple layers. Materials of the multilayer laser radiation film units 11 are different from each other, and each layer of the laser radiation film units 11 emits the red laser and the green laser after being excited by the blue laser. Take two layers of a first laser radiation film unit 16 and a second laser radiation unit 17 as an example, materials of the first laser radiation film unit 16 and the second laser radiation unit 17 are different from each other, and the first laser radiation film unit 16 and the second laser radiation unit 17 can emit a red laser and a green laser after being excited by the blue laser.

In the embodiment, since threshold values of different laser dyes, inorganic group III or group V semiconductor materials, laser crystals, or laser materials are different, and colors of the emitted light are different according to a ratio of the materials, thus, the laser radiation film 3 composed of the multilayer laser radiation film units 11 of different materials can be applied to blue laser diodes 2 with different powers, which has a wide range of applications and is conducive to ensuring that the laser radiation film 3 emits sufficient amounts of red laser and green laser when excited, thereby ensuring the amount of white light formed.

Figure 4:
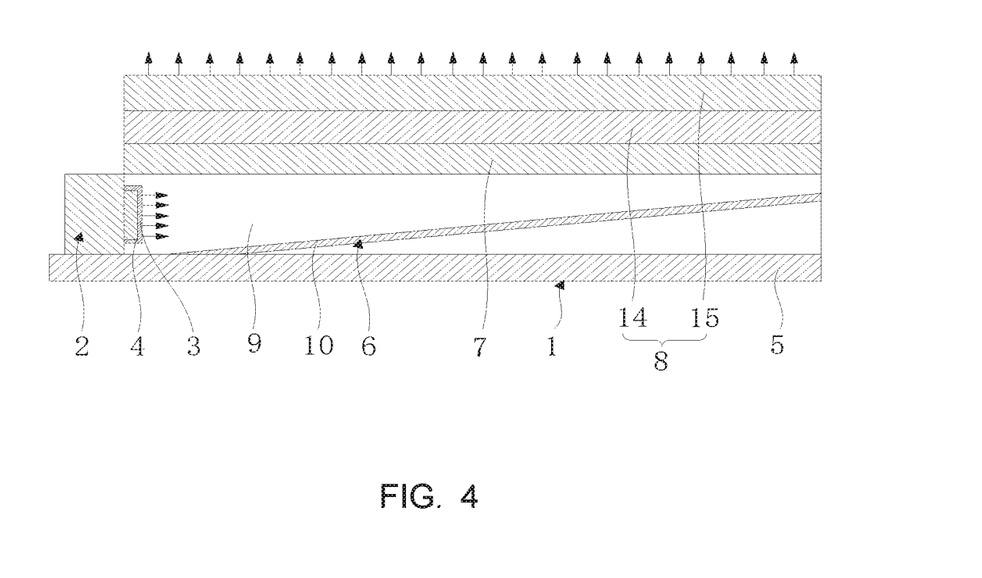
FIG. 4 is a partial structural view of another side-type backlight module provided by the embodiment of the present invention.

As shown in FIG. 4, an embodiment of the present invention further provides a side-type backlight module 1. The difference from the above embodiment is that the laser radiation film 3 covers the light emitting surface 4 of the blue laser diode 2. The blue laser emitted by the blue laser diode 2 excites the laser radiation film 3 to emit a red laser and a green laser. The white light formed by mixing the blue laser, the red laser, and the green laser is reflected to the light guide plate 7 through the reflective surface 10 of the reflective layer 6, and uniformly emitted through the light guide plate 7 and the optical film group 8.

Specifically, the laser radiation film 3 can also cover an entire exterior of the blue laser diode 2 to avoid light leakage.

In the embodiment, a structure of the laser radiation film 3 disposed on the light emitting surface 4 of the blue laser diode 2 is equivalent to a white light diode. The white light with better spectral purity and a larger color gamut can be obtained directly on the light emitting side of the blue laser diode 2, which is conducive to saving a use of the laser radiation film 3 and thus reducing production costs.

Figure 5:
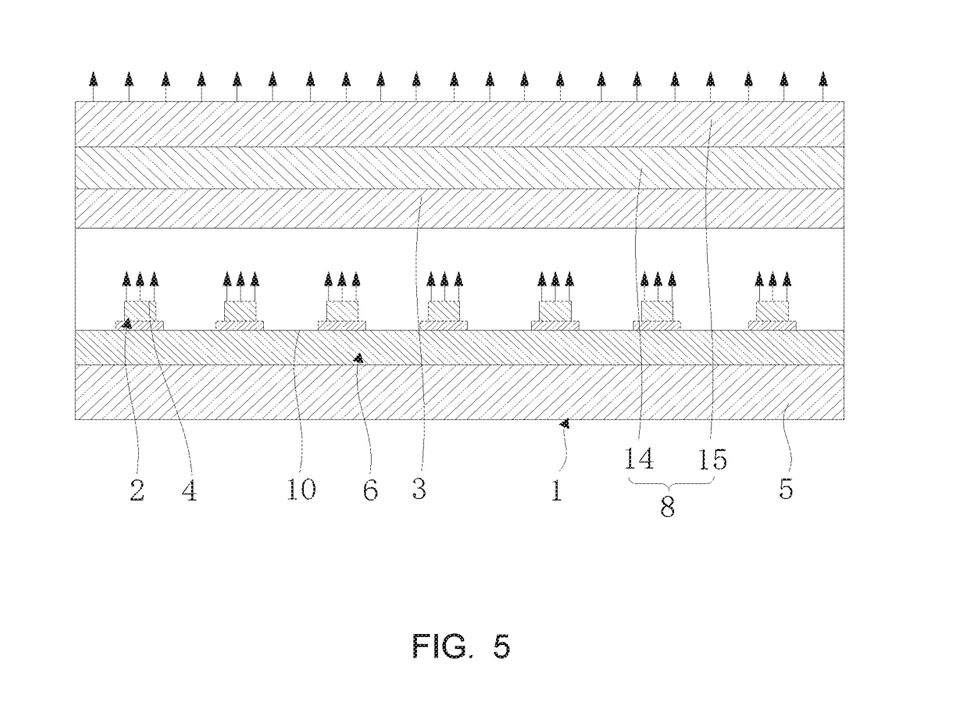
FIG. 5 is a partial structural schematic view of a direct-type backlight module provided by the embodiment of the present invention.

As shown in FIG. 5, an embodiment of the present invention further provides a direct-type backlight module 1. The difference from the above embodiment is that the backlight module 1 comprises a back plate 5, a reflective layer 6 disposed on the back plate 5, a blue laser diode 2 disposed on the reflective layer 6, an optical film group 8 disposed opposite to the reflective layer 6 and disposed on the blue laser diode 2, and a laser radiation film 3 disposed on a side of the optical film group 8 close to the reflective layer 6.

Specifically, a light emitting surface 4 of the blue laser diode 2 and a reflecting surface 10 of the reflective layer 6 are both disposed toward the optical film group 8, that is, disposed toward the laser radiation film 3. The blue laser diode 2 emits a blue laser in a direction of the optical film group 8 (direction of the laser radiation film 3).

Specifically, the blue laser diode 2 emits the blue laser in the direction of the laser radiation film 3, and the blue laser excites the laser radiation film 3 to emit a red laser and a green laser. White light formed by mixing the blue laser, the red laser, and the green laser light is uniformly emitted through the optical film group 8.

Specifically, a number of the blue laser diodes 2 is plural, and the blue laser diodes 2 may be arranged in an array on the reflective layer 6, and the specific number is not limited.

Specifically, the optical film group 8 comprises a diffusion sheet 14 and a prism sheet 15 which are sequentially disposed on the laser radiation film 3. Of course, the optical film group 8 may also be a combination structure between a plurality of diffusion sheets and a plurality of prism sheets, which is not limited here.

In the embodiment, the blue laser emitted by the blue laser diode 2 excites the laser radiation film 3 to radiate the red laser and the green laser with narrower half-value widths, so that the blue laser is mixed with the red laser and the green laser to form the white light for a display light source. On one hand, the obtained white light has better spectral purity and a larger color gamut range, which is conducive to high color gamut display. On the other hand, the laser radiation film 3 can obtain a uniform surface light source, and the light guide plate 7 and the optical film group 8 can further improve a uniformity of the backlight. In addition, the backlight module of the present invention has a simple preparation process, can be well combined with current process, and can effectively reduce production costs.

Figure 6:
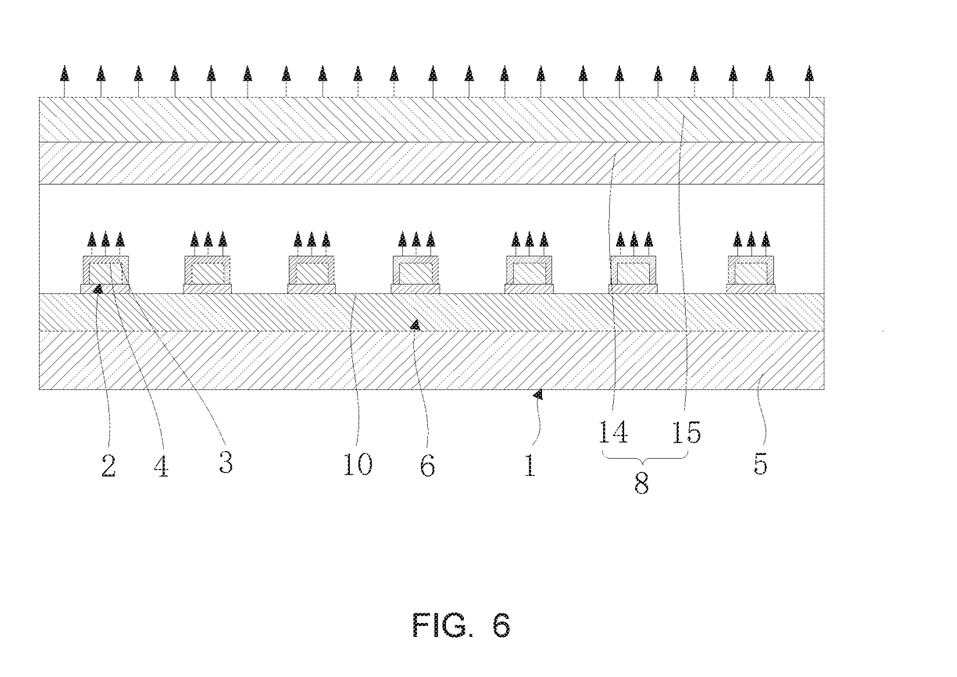
FIG. 6 is a partial structural schematic view of another direct-type backlight module provided by the embodiment of the present invention.

As shown in FIG. 6, an embodiment of the present invention further provides a direct-type backlight module 1. The difference from the above embodiment is that the laser radiation film 3 covers the light emitting surface 4 of the blue laser diode 2. The blue laser diode 2 emits a blue laser in a direction of the optical film group 8, and the blue laser excites the laser radiation film 3 to emit a red laser and a green laser. White light formed by mixing the blue laser, the red laser, and the green laser is directed toward the optical film group 8 and is uniformly emitted through the optical film group 8.

In the embodiment, a structure of the laser radiation film 3 disposed on the light emitting surface 4 of the blue laser diode 2 is equivalent to a white light diode. The white light with better spectral purity and a larger color gamut can be obtained directly on the light emitting side of the blue laser diode 2, which is conducive to saving a use of the laser radiation film 3 and thus reducing production costs.

Figure 7:
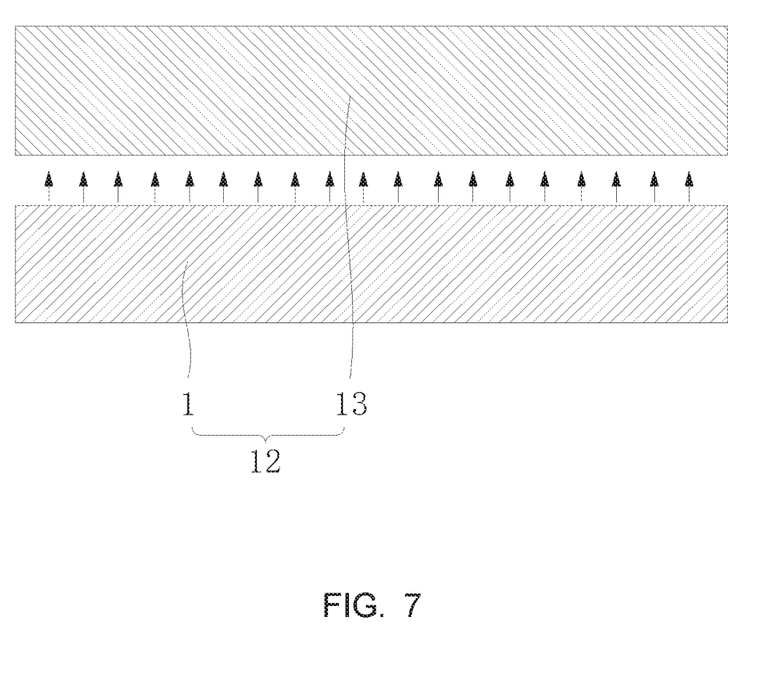
FIG. 7 is a schematic structural view of a display device according to the embodiment of the present invention.

As shown in FIG. 7, an embodiment of the present invention further provides a display device 12 comprising the backlight module 1 in the above embodiment, and a display panel 13 is disposed corresponding to the backlight module 1.

Specifically, a specific structure of the backlight module 1 will not be repeated here.

Specifically, the display panel 13 comprises a liquid crystal display panel, that is, comprises a TFT array substrate and a color filter substrate disposed opposite with each other, and a liquid crystal layer disposed between the TFT array substrate and the color filter substrate. Of course, the display panel 13 may also be another type of display panel, which is not limited here.

In the embodiment, in the backlight module 1, the blue laser emitted by the blue laser diode 2 excites the laser radiation film 3 to radiate the red laser and the green laser with narrower half-value widths, so that the blue laser is mixed with the red laser and the green laser to form the white light for the backlight of the display panel 13. The obtained white light has better spectral purity and a larger color gamut range, which is beneficial to the display panel 13 with high color gamut. In addition, compared with an exemplary use of a red laser diode, a green laser diode, and a blue laser diode to respectively emit red, green, and blue three-color lasers to form a white light source, the backlight module 1 of the present invention has a simple preparation process, can be well combined with current backlight process and processes of the display panel 13, and can effectively reduce production costs.

In the above embodiments, the description of each embodiment has its own emphasis. For a part that is not described in detail in an embodiment can refer to related descriptions in other embodiments.

The backlight module and display device provided in the embodiments of the present invention have been described in detail above. Specific examples are used in this article to explain the principle and implementation of this application. The descriptions of the above embodiments are only used to help understand the technical solution of this application and its core ideas. Those of ordinary skill in the art should understand that they can still modify the technical solutions described in the foregoing embodiments, or equivalently replace some of the technical features. These modifications or replacements do not depart from the scope of the technical solutions of the embodiments of the present application.

What is claimed is:

1. A backlight module, comprising:
   a blue laser diode and a laser radiation film, wherein the laser radiation film covers an entire exterior of the blue laser diode, and the laser radiation film comprises laser radiation film units disposed in multiple layers, wherein the blue laser diode emits a blue laser, and each layer of the laser radiation film units emits a red laser and green laser after the laser radiation film units are excited by the blue laser; and
   wherein the blue laser, the red laser, and the green laser are mixed to form white light.

2. The backlight module as claimed in claim 1, wherein a material of the laser radiation film comprises at least one of a laser dye, an inorganic group III or group V semiconductor material, a laser crystal, and a laser material; and
   wherein, the laser dye comprises at least one of coumarins, rhodamines, cyanines, and azines, the laser crystal comprises at least one of Nd:YAG crystal, Nd:YLF crystal, Nd:YV04 crystal, Yb:YAG crystal, and Nd:YAG polycrystalline ceramic, and the laser material comprises at least one of quantum dots, all-inorganic perovskites, and organic-inorganic hybrid perovskites.

3. The backlight module as claimed in claim 1, wherein materials of the multilayer laser radiation film units are different from each other.

4. The backlight module as claimed in claim 1, wherein the backlight module is a side-type backlight structure, and the backlight module further comprises a light guide plate and a reflective layer;
   wherein an included angle between the light emitting surface of the blue laser diode and a reflective surface of the reflective layer is an acute angle, so that an emitted light is reflected through the reflective surface; and
   wherein an included angle between the reflection surface of the reflection layer and the light guide plate is an acute angle, so that light reflected by the reflection surface enters the light guide plate.

5. The backlight module as claimed in claim 4, wherein the white light formed by mixing the blue laser, the red laser, and the green laser is reflected to the light guide plate through the reflection surface of the reflection layer, and is uniformly emitted through the light guide plate.

6. The backlight module as claimed in claim 1, wherein the backlight module is a direct-type backlight structure, and the backlight module further comprises an optical film group and a reflective layer that are disposed opposite with each other; and
   wherein the blue laser diode is disposed on the reflective layer, both the light emitting surface of the blue laser diode and a reflective surface of the reflective layer are disposed toward the optical film group, and the blue laser diode emits the blue laser in a direction of the optical film group.

7. The backlight module as claimed in claim 6, wherein the blue laser diode emits the blue laser in the direction of the optical film group, and the blue laser excites the laser radiation film to emit the red laser and the green laser; and
   wherein the white light formed by mixing the blue laser, the red laser, and the green laser is emitted toward the optical film group, and is uniformly emitted through the optical film group.

8. The backlight module as claimed in claim 6, wherein the optical film group comprises a diffusion sheet disposed close to the reflective layer, and a prism sheet disposed on a side of the diffusion sheet away from the reflective layer.

9. The backlight module as claimed in claim 1, wherein the blue laser emitted by the blue laser diode has a wavelength range of 400 nm to 450 nm.

10. A display device, comprising:
   a backlight module as claimed in claim 1; and
   a display panel disposed corresponding to the backlight module.

11. The display device as claimed in claim 10, wherein materials of the multilayer laser radiation film units are different from each other.

12. The display device as claimed in claim 10, wherein the backlight module is a side-type backlight structure, and the backlight module further comprises a light guide plate and a reflective layer;
   wherein an included angle between the light emitting surface of the blue laser diode and a reflective surface of the reflective layer is an acute angle, so that an emitted light is reflected through the reflective surface; and
   wherein an included angle between the reflection surface of the reflection layer and the light guide plate is an acute angle, so that light reflected by the reflection surface enters the light guide plate.

13. The display device as claimed in claim 12, wherein the white light formed by mixing the blue laser, the red laser, and the green laser is reflected to the light guide plate through the reflection surface of the reflection layer, and is uniformly emitted through the light guide plate.

14. The display device as claimed in claim 10, wherein the backlight module is a direct-type backlight structure, and the backlight module further comprises an optical film group and a reflective layer that are disposed opposite with each other; and
   wherein the blue laser diode is disposed on the reflective layer, both the light emitting surface of the blue laser diode and a reflective surface of the reflective layer are disposed toward the optical film group, and the blue laser diode emits the blue laser in a direction of the optical film group.

15. The display device as claimed in claim 14, wherein the blue laser diode emits the blue laser in the direction of the optical film group, and the blue laser excites the laser radiation film to emit the red laser and the green laser; and
   wherein the white light formed by mixing the blue laser, the red laser, and the green laser is emitted toward the optical film group, and is uniformly emitted through the optical film group.

16. The display device as claimed in claim 10, wherein the display panel comprises a liquid crystal display panel.

* * * * *